March 2, 1943. H. G. LUBKE 2,312,764
METHOD AND APPARATUS FOR STRAINING LIQUIDS
Filed June 21, 1940 2 Sheets-Sheet 1
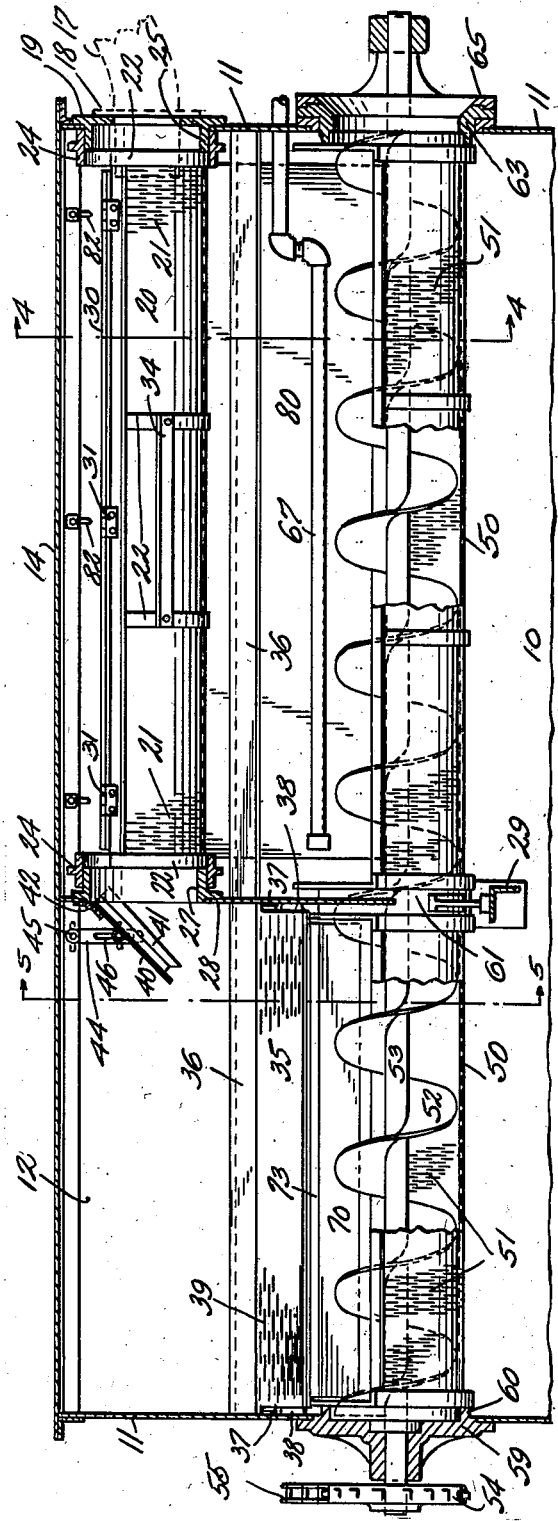
INVENTOR.
Henry G. Lubke
By Parker, McKnow & Farmer.
ATTORNEYS.

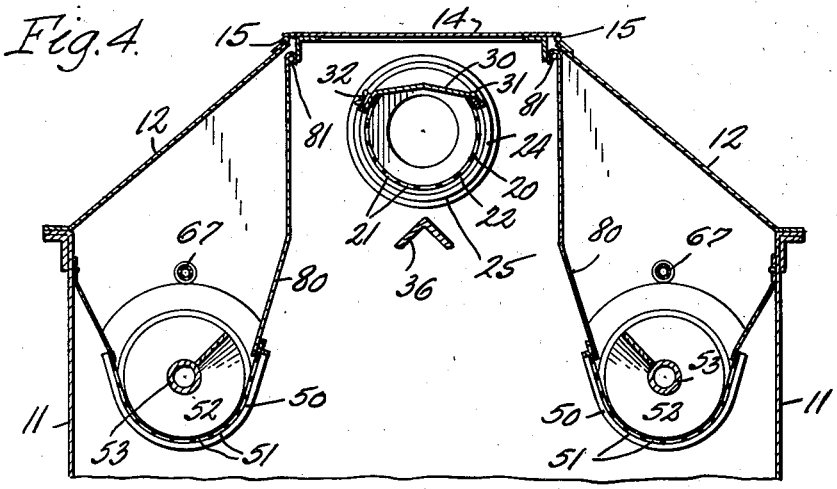
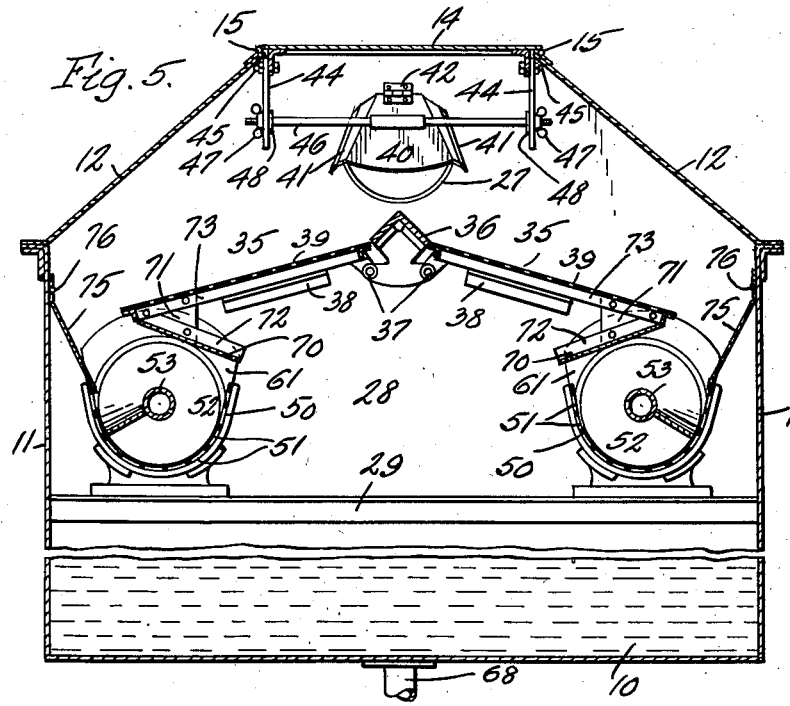

Patented Mar. 2, 1943

2,312,764

UNITED STATES PATENT OFFICE 2,312,764

METHOD AND APPARATUS FOR STRAINING LIQUIDS

Henry G. Lubke, Buffalo, N. Y., assignor to The Wittemann Company, Inc., Buffalo, N. Y.

Application June 21, 1940, Serial No. 341,695

12 Claims. (Cl. 210—149)

This invention relates to improvements in apparatus for straining liquids, such for example as brewers' wort, which is strained to remove the hops therefrom.

One of the objects of this invention is to provide a straining apparatus of improved construction and of high efficiency by means of which the material strained from the liquid is continuously removed therefrom.

Another object is to provide an apparatus of this kind with a novel arrangement of a strainer conduit and plates, whereby a large capacity is obtained within a minimum of space.

A further object is to provide an apparatus of this kind in which all of the parts are readily accessible for a thorough cleaning of the same.

Another object of this invention is to provide a straining apparatus having a perforate conduit into which liquid to be strained is admitted and from which liquid is discharged through the perforations therein and in which the material to be separated from the liquid is continuously removed from the other end of the conduit during the operation of the apparatus. It is also an object of this invention to provide an improved method of straining wort in a perforate conduit by removing liquid through the perforations of the conduit and continuously removing hops from the conduit to prevent a washing or scouring action thereon by the wort. It is also an object of this invention to provide a straining apparatus with a perforated inlet conduit to which the liquid entering the apparatus is admitted and along which it flows at relatively high velocity and from which some of the liquid is discharged to a strainer plate. It is also an object of this invention to provide an apparatus of this type in which the strainer surfaces are so arranged that the liquid to be strained passes lengthwise of the apparatus in one direction on some strainer surfaces and then flows in the reverse direction on other strainer surfaces through the apparatus, so that both inlet and discharge are arranged at the same end of the apparatus.

A further object is to provide a perforate strainer of improved construction. Another object is to provide an improved arrangement of perforate strainer plates whereby a high efficiency is obtained.

Other objects of this invention will appear from the following description and claims.

In the accompanying drawings:

Fig. 1 is a fragmentary, longitudinal, central sectional elevation of a liquid straining apparatus embodying this invention.

Fig. 2 is a fragmentary, transverse elevation, partly in section and on a larger scale, showing a liquid baffle or deflector.

Fig. 3 is a fragmentary end elevation of the apparatus, on a reduced scale.

Figs. 4 and 5 are fragmentary, transverse sectional elevations thereof on lines 4—4 and 5—5 respectively, Fig. 1.

Fig. 6 is a fragmentary, transverse sectional elevation showing the mounting of a baffle or partition plate.

Fig. 7 is a fragmentary face view of a portion of a strainer plate showing elongated perforations therein.

Fig. 8 is a fragmentary section showing a locking device for holding a strainer conduit or trough in its operative position.

I have shown in the accompanying drawings one embodiment of my invention which is particularly adapted for use in straining wort to remove hops therefrom. It will be understood, however, that it is not intended to limit this invention to the particular construction illustrated, nor to use in connection with the straining of wort, since obviously my invention may be used for straining other liquids to remove solid or semi-solid materials therefrom.

In the particular construction shown, the straining apparatus is arranged within a housing which may be of any suitable or desired form, that shown being of substantially rectangular form and includes a lower portion 10 in which the strained liquid is collected. The housing has upright side and end walls 11 and the upper part of the housing is closed by means of two or more cover plates 12, which are arranged at opposite sides of a stationary middle portion 14 of the housing. The cover plates 12 preferably extend substantially throughout the length of the housing, a plurality of such cover plates being provided at each side of the housing, if necessary. The cover plates may be hinged to the top wall 14, as indicated at 15, or if desired, the cover plates may be removable from the housing. These cover plates, when swung upwardly or removed from the apparatus render the interior of the housing readily accessible for cleaning the parts of the apparatus contained therein. A housing of any other suitable or desired construction may be employed.

The liquid to be strained enters the apparatus through an opening in one of the end walls thereof, for example, through a pipe or conduit 17 of any suitable form, which may have a flange 18 adapted to be secured to a ring 19 secured to an end wall 11 of the housing, and the liquid is discharged from the pipe 17 into a perforated trough or conduit 20 arranged in the upper portion of the housing. This trough or conduit may be made of any suitable or desired shape, and the perforations may also be of any suitable form. Preferably, I provide perforations in the form of elongated slots 21 extending transversely of the direction of flow of the liquid through the trough.

I have found that in a conduit or trough of this type a very effective straining action takes place. The liquid is discharged into one end of this conduit at relatively high velocity and a large quantity of the liquid flows through the transverse perforations. The remaining liquid carries the hops, or other material to be separated from the liquid, lengthwise of the trough or conduit to the discharge end thereof. This action of the liquid has a two-fold advantage. In the first place, it keeps the perforations clear so that they may discharge liquid at their full capacity and in the second place, it quickly moves out of the conduit the material to be removed from the liquid. This is particularly desirable when the apparatus is used for straining wort, since a washing or scouring action of the liquid on the hops is objectionable. A conduit of the kind shown also has the advantage that no mechanical means are necessary to remove the material from the strainer surface, the flow of liquid itself serving this purpose.

While any suitable or desired type of perforated trough or conduit may be used in connection with my improved straining apparatus, yet I prefer to employ a trough which may be moved out of its operative position into a position in which it can be readily cleaned. In the construction shown for this purpose, the trough is provided with reinforcing annular bands 22 which are arranged at intervals lengthwise of the trough. The bands 22, arranged at the opposite ends of the trough, are secured to rings 24. The ring 24 at the receiving end of the trough is rotatably mounted above an inwardly extending flange 25 of the ring 19, secured to the end wall 11, and the other ring 24 at the discharge end of the trough 20 is mounted to rotate on a ring 27 secured on a partition wall 28 extending across the upper portion of the housing of the apparatus. The partition wall 28 which supports the inner end of the trough or conduit 20 may be supported at its lower end on a transversely extending bar or frame member 29.

By means of the construction described, it will be noted that the trough 20 may be rotated about the axis of the supporting flanges 25 and 27 in either direction, so that the interior of the trough as well as the exterior thereof may be readily accessible through openings in the housing when the cover plates 12 are swung into open positions. The trough or conduit 20 may be in the form of a single cylindrical conduit or tube open only at its ends, or if desired, the trough or conduit 29 may be divided lengthwise into two or more parts, as shown, the upper part being in the form of a cover or lid 30, that shown being hinged at 31 to one longitudinal edge of the trough 20 and having its other edge secured to the opposite edge of the trough in any suitable manner, for example, by means of thumb nuts 32 or the like. I have also shown in Fig. 1 a bar 34 which connects two of the reinforcing bands 22 to facilitate rotating the trough.

A considerable portion of the liquid entering the trough or conduit 20 will pass through the perforations therein, and the balance of the liquid, together with the material to be strained from the liquid is discharged from the inner end of the trough on the upper surface of one or more perforated strainer plates 35, two such plates being shown in the construction illustrated. These strainer plates are arranged at an inclination so that liquid discharged to the upper portions thereof will flow downwardly toward the opposite sides of the apparatus. The upper portions of the plates are connected to a frame member 36 which is secured at its opposite ends to an end wall 11 and to the partition wall 28 of the apparatus. Preferably, the plates 35 are hinged at 37 to the frame member 36, so that these strainer plates can be readily swung about the hinges 37 into upwardly and outwardly inclined positions, in which the lower faces thereof are accessible through the openings in the housing when the cover plates 12 are swung into open positions. When in their lower or operative positions, the opposite ends of the strainer plates may rest on suitable supports, such as the flanges of angle bars 38 secured to an end wall 11 of the housing and to the partition 28.

The strainer plates 35 may be provided with perforations of any suitable or desired type. I have found that the best results are obtained by making these perforations in the form of narrow slots 39 extending transversely of the direction of flow of the liquid on the strainer plates, see Fig. 8, in which the arrangement of the slots relatively to each other is shown. In this figure the width of the slots is, however, somewhat greater than required for hops. The proportions of these slots will, however, vary, depending upon the material to be separated from the liquid. These slots 39 may be similar to the slots 21 shown on the trough or conduit 29 and are sufficiently narrow in width so that the material to be removed from the liquid will not pass through the slots. I have found that by arranging these slots transversely of the direction of flow of the liquid, both in the trough or conduit 29 and in the strainer plates 35, the material to be removed from the liquid such, for example, as hops, is readily carried by the liquid across the slots without passing through the same or lodging thereon. I have also found that the inclination of the strainer plates has an important bearing upon the amount of liquid which passes through the slots in the strainer plates. In order to obtain the maximum efficiency of the strainer plates, I arrange them at angles of from 10° to 20° from the horizontal. When the strainer plates are arranged at this angle and the slots extend transversely of the flow of the liquid, a large amount of liquid flows through the perforations of the strainer plates and sufficient liquid flows down the strainer plates to the lower edges thereof to carry with it the material to be removed from the liquid. Consequently, by means of this arrangement of the slots and the relatively small angle of inclination of these plates, the liquid may flow relatively slowly crosswise of the strainer plates and still remove the hops or other material from the slots and cause the same to pass downwardly beyond the lower edges of the strainer plates.

In many instances, the flow of liquid in the strainer trough or conduit 20 is so rapid that it is desirable to provide means for deflecting the liquid discharged from this trough downwardly toward the strainer plate or plates 35 to effect a substantially uniform distribution of liquid on the surfaces of the strainer plates. In the particular construction shown for this purpose, I have provided a deflector at the discharge end of the trough 20. This deflector may be of any suitable or desired form, that shown including a plate 40 supported on the partition wall 28. The deflector may be provided at opposite sides of the transverse plate 40 with side plates or wings 41 to prevent the liquid impinging against the plate 40 from spreading sidewise. Preferably, the deflector is adjustable so that the desired distribution of the liquid discharged from the trough 20 on the strainer plates 35 may be effected, and this adjustment will, of course, vary, depending upon the rate of flow of the liquid discharged from the trough or conduit 20. Any suitable or desired means may be employed for this purpose, and in the construction shown, I have shown the deflector adjustable to various angles relatively to the conduit 20. For example, the upper edge of the deflector may be pivoted on the partition wall 28 by means of a hinge 42. The deflector may be secured in adjusted position in any desired manner, for example, by means of a pair of slotted links 44, the upper ends of which are pivoted at 45 on a part of the frame or housing of the machine. There is secured to the deflector a bar or rod 46 extending transversely of the machine and the ends of this bar extend through the slots in the links 44 and may be adjustably secured thereto in any suitable manner. In the construction shown, the ends of the rods are threaded, and thumb nuts 47, see Fig. 2, are provided, each of which engages one face of the corresponding slotted links 44 and a shoulder portion or flange 48 engages the other face of the slotted link. By tightening the thumb nuts 47, the rod 46 may be secured in such relation to the slotted links 44 as to effect the desired adjustment of the deflector about the hinge 41. A deflector of any other suitable or desired form may be employed, and if desired, the deflector may be omitted.

The liquid and the material discharged from the lower ends of the strainer plates pass into a pair of perforated troughs 50 arranged near the opposite sides of the apparatus and extending substantially throughout the length of the housing. These troughs also may be provided with any suitable or desired perforations, but the perforations are preferably similar to those used in connection with the trough or conduit 20 and the strainer plates 35, being in the form of slots 51 extending crosswise of the direction of movement of material in the troughs. These troughs, except for the slots 51, may be similar in construction to those shown in the Tiedman Patent No. 2,146,692 of February 7, 1939. In each trough, a spiral conveyor 52 is provided which has a shaft 53, the ends of which are suitably journalled in bearings supported on the end walls 11 of the housing. These shafts 53 may be provided beyond an end of the housing with sprocket wheels 54 which cooperate with sprocket chains 55 which may be driven from an electric motor 56 in any suitable or desired manner, the motor in the construction shown being mounted on the top of the apparatus. As described in the aforementioned Tiedman patent, the troughs 50 are arranged to be inverted for cleaning and are mounted in such a manner that each trough can be swung about an axis substantially coinciding with the axis of its conveyor shaft 53. Any suitable or desired mounting for this purpose may be provided. In the construction shown, each conveyor trough is formed in two sections, each section extending from the partition wall 28 to an end wall 11 of the housing. The partition wall 28 is, of course, provided with openings through which the conveyor extends. In the particular construction shown, one of the bearing supports 59 for the conveyor shaft 53 is provided with an annular flange 60 extending into the interior of the housing and which forms a support for one end of a section of the trough 50. Another support 61 is mounted on the transversely extending frame member 28 and forms a rotatable support for the two adjacent ends of the sections of the trough 50, and at the discharge end, the trough is rotatably supported on an annular member 63 through which the hops or other material removed from the liquid may be discharged from the apparatus. An annular support 65 for the other bearing of the conveyor shaft 53 may be suitably mounted on the adjacent end wall 11 of the housing.

The hops or other material to be removed from the liquid are continuously moved toward the discharge end of the troughs 50 by means of the conveyors 52. By the time the material passes through the opening in the partition 28, most of the liquid has been removed therefrom, and if desired, the remaining wort or other liquid adhering to the material may be flushed or sparged therefrom in any suitable manner, for example, by means of water discharged from sparge or spray pipes 67 extending over portions of the troughs 50. The hops or other material is discharged from the apparatus through the annular bearing support 65. The strained liquid is collected in the bottom of the housing and may be drained therefrom through a discharge pipe 68.

In order to provide the maximum straining surface on the plates 35, I preferably extend the lower ends of these plates partly across the troughs 50. In order to prevent liquid which passes through the perforations in those portions of the strainer plates which are located above the troughs 50 from passing into the troughs, I provide over each trough an imperforate deflector plate 70. These plates are inclined in the opposite direction from the strainer plates 35 and their lower ends terminate beyond the inner edges of the troughs 50. The deflector plates may be mounted in any suitable or desired manner, and in the construction shown, I have secured these deflector plates to the strainer plates 35, for example, by means of angle pieces 71 suitably secured at their lower ends to the deflector plates 70, for example, to upwardly extending flanges 72 thereof and the upper edges of these connecting plates 71 may be secured to supporting frames 73 on which the strainer plates 35 are mounted. Any other means for securing the deflector plates 27 in operative relation to the troughs 50 may be provided.

In order to prevent liquid discharging from the strainer plates 35 from passing beyond the outer edges of the troughs 50, I preferably provide guard plates 75 which extend from the side walls 11 of the apparatus to the outer edges of the troughs 50. In order to facilitate the cleaning of the apparatus, these guard plates may be secured to the side walls of the apparatus by means of hinges 76. When the plates 75 are swung upwardly about these hinges 76, they not only occupy positions in which both sides thereof can be readily cleaned, but they are also moved out of engagement with the troughs 50 so that these troughs can be rotated about their pivotal axes.

The arrangement of the various straining devices, as shown, results in a very efficient and compact apparatus. As is clearly shown in the drawings, the liquid to be strained is first admitted to the strainer trough or conduit 20 which is located in the longitudinal middle upper portion of the apparatus, so that liquid discharged therefrom may flow downwardly into the lower part of the apparatus through the space between the two troughs 50. In order to prevent any of the liquid discharged through the perforations in the trough or conduit 20 from entering into the lower troughs 50, I preferably provide partitions or baffles of suitable construction. For example, baffles 80, which are in the form of imperforate plates, may be arranged to extend upwardly from the inner edges of the troughs 50, see particularly Fig. 4. These baffles are preferably mounted so that they may be removed to render the inlet trough or conduit 20 or other parts of the apparatus accessible for cleaning through the openings in the upper part of the housing. In the construction shown for this purpose, the upper ends of the baffles 80 are bent or looped over to engage bars or rods 81 extending lengthwise of the apparatus adjacent to the upper ends of the cover plates 12. These rods may be supported in any suitable or desired manner, for example, by means of supporting brackets 82 arranged at intervals and secured to the top wall 14 of the housing. The lower edges of these baffles 80 may, as shown, rest against the upper edges of the troughs 50, or if desired, the baffles may simply hang downwardly from their supporting rods 81. When the cover plates 12 are swung into their open positions about their hinges 15, the baffles 80 can be lifted out of engagement with their supporting rods 81 and can be removed from the apparatus through the openings therein, which are normally closed by the cover plates 12. Any other means for preventing strained liquid from the trough or conduit 20 from entering the conveyor troughs 50 may be provided.

In the manufacture of beer, it is, of course, very essential that the apparatus be capable of being thoroughly cleaned after use of the same. After the cover plates 12 are swung upwardly and the baffles 80 are removed from the apparatus, the straining trough or conduit 20 may be turned in its bearings to face either of the openings provided by the removal of the cover plates, whereupon the cover or lid 30 of the trough or conduit 20 may be opened, so that the interior of the conduit 20 as well as the inner face of the lid 30 are accessible for cleaning. The exterior of the trough or conduit 20 can also be more easily cleaned by swinging the same into different positions about its pivotal axis.

When the cover plates 12 are opened, the upper faces of the strainer plates 35, as well as the interior of the housing, are accessible for cleaning, and if the strainer plates are swung about their hinges 37, then the lower surfaces of the strainer plates 35 as well as the deflector plates 70, can be easily cleaned. When the outer ends of these plates 70 are swung upwardly, the interior of the lower part of the housing is also rendered accessible for cleaning. The troughs 50 may also be thoroughly cleaned, the inner surfaces thereof being accessible while in their operative positions, and the outer or under surfaces thereof being accessible when the troughs 50 are turned about their pivotal axes into substantially inverted positions.

Any suitable means may, of course, be provided for releasably holding the troughs 20 and 50 in their operative positions. In the construction shown in Fig. 8, I have by way of example shown a spring actuated latch or bolt 90 suitably mounted on the ring 24 to which the trough or conduit 20 is secured. This bolt 90 is yieldingly pressed by means of a spring 91 in a direction to pass through a hole in the ring 24 and into a registering hole or recess in the annular flange 27 which is secured to partition 28, and on which the ring 24 is rotatably mounted. The holes in the ring 24 and flange 27 are so located that the bolt will extend into both of these holes only when the trough or conduit 20 is in its operative position. The upper end of the bolt may easily be moved by an operator against the action of the spring 91 into a releasing position, whereupon the trough 20 may be turned about its longitudinal axis. Locking devices of any other suitable kind may be provided and preferably similar or other suitable locking devices are also employed in connection with the sections of the trough 50 for holding them in their operative positions.

In the operation of the apparatus, the liquid enters the trough or conduit 20 at high velocity. A considerable portion of the liquid flows through the perforations 21 in the conduit 20 and the velocity of the remainder of the liquid is sufficient to carry the hops or other material to be removed from the liquid out of the conduit 20. The liquid discharged from the conduit 20 impinges against the deflector formed by the plates 40 and 42 and is distributed across the upper portions of the strainer plates 35. The liquid then flows by gravity along the inclined strainer plates, much of the liquid passing through the perforations 39. The remainder of the liquid flushes the hops or other material to the lower edges of the strainer plates and flows into the troughs 50. The remainder of the liquid is separated from the material to be removed therefrom in the troughs 50 and this material is rapidly removed from the apparatus by means of the spiral conveyors 52. The continual and rapid removal of hops from wort is a very important factor in producing the desired flavor in beer, since if the hops remain in the hot wort for longer than the desired time, or if they are subjected to a washing or scrubbing action by the liquid, an undesirable bitter taste is imparted to the beer, due to the fact that some of the less soluble substances contained in the hops will become dissolved in the wort. By means of the improved apparatus herein shown, because of the efficient and rapid straining action, and because of the continuous removal of hops from the straining surfaces during the operation of the apparatus, only the desired flavor is imparted to the wort from the hops, and the undesirable bitter ingredients of the hops are kept out of the wort. The continuous removal of the hops or other material from the straining surfaces also has the advantage of keeping the perforations of these surfaces clear for the passage of liquid therethrough.

By means of the construction shown, comparatively little power is required to operate the apparatus. The liquid flows through the upper strainer conduit 20 and removes material which would tend to clog the perforations thereof because of its own velocity. It then flows over the inclined strainer plates by gravity, also carrying with it any material deposited on these plates, and finally only a relatively small amount of power is required to rotate the conveyors in the lower troughs which carry the separated material out of the apparatus.

I claim as my invention:

1. In an apparatus for straining a material from a liquid, the combination of a housing, a perforate conduit extending lengthwise of the upper portion of said housing and into one end of which liquid to be strained is admitted, an inclined perforate strainer plate to the upper portion of which liquid containing material to be separated therefrom is discharged from said conduit, some of the liquid passing through the perforations of said plate and another portion of the liquid moving material to be separated from the liquid downwardly along said plate, a trough from which liquid and material discharged from said plate is collected, and conveying means in said trough to carry material collected therein out of the apparatus.

2. An apparatus for straining a material from a liquid, including a housing, a perforate conduit extending inwardly from one end of said housing and into one end of which liquid containing said material is admitted, an inclined perforate strainer plate adjacent to the other end of said housing and to the upper part of which liquid and material is discharged from said conduit, and a perforate trough extending lengthwise of said housing and to one end of which liquid and material from said strainer plate is discharged, and means in said trough for carrying material collected therein toward said end of said housing.

3. In an apparatus for straining a material from a liquid, the combination of a housing, a perforate conduit extending lengthwise of the upper middle portion of said housing from one end thereof, and into which liquid to be strained is admitted, a pair of perforated strainer plates inclined downwardly in opposite directions from the middle portion of said housing and having their upper portions arranged to receive liquid and the material discharged from said conduit, a pair of troughs arranged at opposite sides of said housing and into which liquid and material to be strained therefrom is discharged from said inclined strainer plates, means for moving material lengthwise of said troughs to said end of said housing, said troughs being spaced apart to permit liquid passing through the perforations of said conduit to pass between said troughs, and means in the lower portion of said housing for collecting liquid which is passed through the perforations of said conduit, said strainer plates and said troughs.

4. In an apparatus for straining a material from a liquid, the combination of a housing having an opening in the upper portion thereof, a removable cover for normally closing said opening, a perforate conduit arranged substantially horizontally in said housing and having a longitudinal upper opening, a lid for closing said opening and which may be moved into open position to expose the exterior of said conduit, means for supporting said conduit to rotate about an axis extending longitudinally thereof to render all portions thereof accessible to said opening in said housing, and a latch for normally and releasably holding said conduit against rotation only when in its operative position in which said longitudinal opening is in the upper portion of the conduit, said latch being in releasing position during rotation of said conduit while out of its operative position.

5. In an apparatus for straining a material from a liquid, the combination of a housing, a perforate conduit extending lengthwise of said housing and to one end of which liquid to be strained is admitted and from the other end of which some of said liquid and said material are discharged, an inclined perforate strainer plate arranged in liquid receiving relationship to said other end of said conduit and to the upper portion of which liquid is discharged from said conduit, and a deflector arranged at the discharge end of said conduit and inclined downwardly and in the direction of flow of liquid discharged from said conduit and against which liquid may impinge for directing the same downwardly upon said strainer plate.

6. In an apparatus for straining a material from a liquid, the combination of a housing, a perforate conduit extending lengthwise of said housing and to one end of which liquid to be strained is admitted and from the other end of which some of said liquid and said material are discharged, an inclined perforate strainer plate arranged in liquid receiving relationship to said other end of said conduit and to the upper portion of which liquid is discharged from said conduit, a deflector arranged at the discharge end of said conduit and inclined downwardly and in the direction of flow of liquid discharged from said conduit and which deflects liquid downwardly upon the upper portion of said strainer plate, and means for adjustably securing said deflector in various angular relations to said conduit to provide the desired distribution of said liquid on said strainer plate.

7. In an apparatus for straining hops from wort, the combination of an inclined perforate strainer plate, means for discharging wort to be strained to the upper portion thereof, means for receiving wort and hops at the lower end of said plate, the perforations of said plate being in the form of long narrow slots extending substantially transversely of the direction of flow of wort on said strainer plate, said strainer plate being arranged at an inclination from 10 to 20 degrees to the horizontal.

8. A straining device for use in straining hops from wort and comprising a stationary sheet of material having a plurality of relatively long and narrow slots formed therein in a direction transverse to the flow of wort and hops on said surface, the face of said material over which the wort flows being otherwise free from obstructions to the flow of wort, the width of said slots being such as to prevent the passage of hops therethrough.

9. In a straining apparatus, the combination of a strainer plate arranged at an inclination, means for discharging liquid on the upper portion of said plate, a perforate trough at the lower edge of said plate and into which material passing over said strainer plate is discharged, the lower edge of said strainer plate extending partially over said trough, and an imperforate inclined deflector arranged under the perforate portion of said strainer plate which extends over said trough for conducting the liquid passing through said portion of the strainer plate beyond an edge of said trough.

10. An apparatus for straining a material from a liquid, including a housing, a perforate conduit in said housing and arranged lengthwise of said housing in the upper portion thereof, means for admitting liquid to be strained into one end of said conduit, a trough arranged in said housing below said conduit, means for discharging liquid and material from the other end of said conduit into said trough, and a baffle arranged between said conduit and said trough to prevent liquid discharging through perforations in said conduit from entering said trough, and means in said trough for removing material from said apparatus.

11. An apparatus for straining a material from a liquid, including a housing, a perforate conduit in said housing and arranged lengthwise of said housing in the upper portion thereof, means for admitting liquid to be strained into one end of said conduit, a pair of troughs arranged at opposite sides of said housing below said conduit, means for conducting liquid discharged from said conduit to said troughs, and baffles arranged between said conduit and said troughs and spaced apart to permit liquid passing through the perforations of said conduit to drop between said troughs, said baffles preventing liquid passing through said perforations of said conduit from entering into said troughs.

12. An apparatus for straining a material from a liquid, including a housing, a perforate conduit in said housing and arranged lengthwise of said housing in the upper portion thereof, means for admitting liquid to be strained into one end of said conduit, a pair of troughs arranged at opposite sides of said housing below said conduit, a pair of inclined perforate strainer plates having their upper portions arranged to receive liquid and material from the other end of said conduit and having their lower portions arranged to discharge liquid and material to said troughs, and means for conducting liquid discharged through the perforations of said conduit into the lower portion of said housing between said troughs.

HENRY G. LUBKE.